United States Patent Office 3,066,766
Patented Dec. 4, 1962

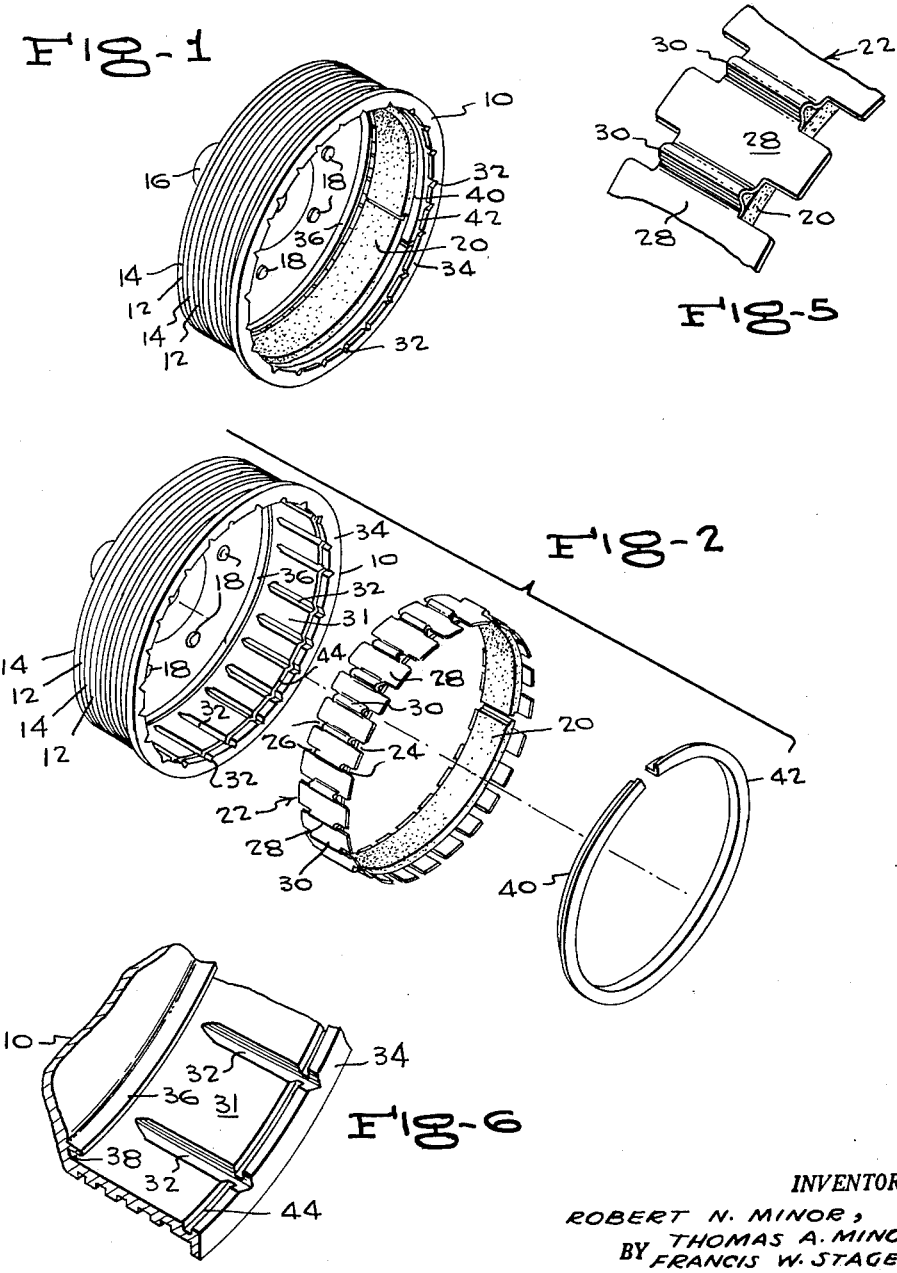

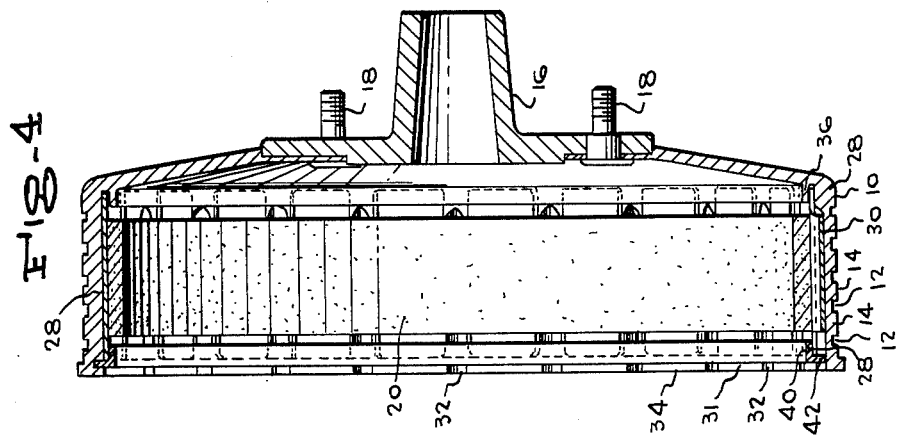
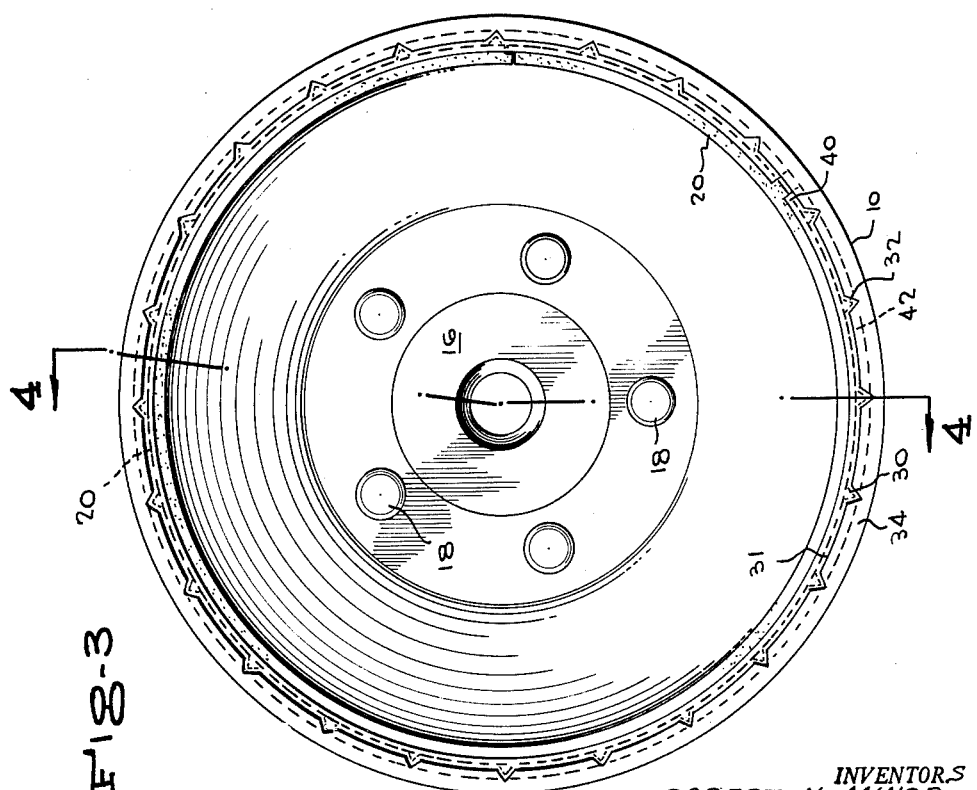

3,066,766
QUICK CHANGE BRAKE LINING
Robert N. Minor and Thomas A. Minor, R.F.D. 2, Rockville, Conn., and Francis W. Stager, Rte. 1, Stafford Springs, Conn.
Filed Apr. 4, 1961, Ser. No. 100,574
4 Claims. (Cl. 188—78)

This invention relates to vehicle brakes of the band type. In current practice the brake bands, or lining, are carried in segments on a plurality of brake shoes, which are actuated to urge the bands outwardly into contact with the inner face of a cylindrical brake drum carried by the vehicle wheel. This system has many undesirable features, prominent among which are the need for skilled workmen for the complex and time consuming installation and adjustment, the need for frequent adjustment, uneven wear in the bands as well as the drum, and the need for periodic machining of the drum. The unwelcome features which concern wear and damage are related in large measure to the unduly high temperatures engendered in the system.

It is therefore an object of the invention to provide a brake system which is simple in construction, and easy of installation, adjustment, maintenance and replacement, and which minimizes frictional heat effects together with wear and other damage. Other objects include lowering of cost, increase of effective brake lining area, evenness of wear and lengthening of band life.

These and other objects which will be apparent to those skilled in the art, are attained by the present invention, which may be briefly described as comprising a single length of brake lining, bonded to a backing ring or band, the latter having a series of outwardly extending splines, which are receivable in corresponding grooves in the inner face of the brake drum, so as to key the liner and its backing to the drum for rotation therewith, the insert being held in place by a split ring keeper, insertable in a circular groove or channel in the inner face of the drum.

For a more detailed description of the invention, reference is made to the following specification, as illustrated in the drawings, in which:

FIGURE 1 is a perspective view of a brake drum, with the liner, backing, and keeper ring in place, FIGURE 2 is a view similar to FIGURE 1, showing the parts exploded.

FIGURE 3 is an elevational view, looking into the open side of the drum,

FIGURE 4 is a sectional view taken on the line 4—4 of FIGURE 3,

FIGURE 5 is a fragmentary view of a portion of the backer and lining of FIGURE 2, enlarged, and FIGURE 6 is a fragmentary view of a portion of the drum of FIGURE 2, enlarged.

Referring to the drawings by characters of reference, there is shown a cylindrical brake drum 10 having the usual circular grooves 12 providing heat-dissipating fins 14. Conventionally, the drum has a separate hub portion 16, and is secured to a wheel assembly by bolts 18.

The brake band unit, or liner, best seen in FIGURES 2 and 5, comprises a split band or lining 20, which is bonded in any suitable manner to a backing, or holding plate, shown generally by the numeral 22, having equally spaced, side notches 24, 26, aligned in pairs, and defining a series of panels 28 of identical size and shape. The area between the notch pairs, which forms the connecting link between adjacent panels 28 is outwardly struck from the cylindrical surface of panels 28 to form transverse beads or corrugations 30, which function after the manner of splines, to key the band holder to the drum for rotation therewith. To this end, the inner, cylindrical face 31 of the drum has a series of transverse grooves or channels 32, opening through the inner edge 34 of the drum, whereby the band holder is mountable in the drum from without, by a simple, sliding action. For holding the backing plate 22 in strictly cylindrical form when mounted, the inner face of the drum has an annular bead 36, defining with the cylindrical, inner face 31 of the drum, an annular niche 38, which receives the extending ends of panels 28. It will be noted that either set of ends of the panels may be thus received, alternatively, and the band holder is therefore reversible in its drum mounting.

With the band holder in place in the drum, it is locked against removal therefrom by means of a split ring 40, having, at one edge, an outwardly extending, annular flange 42, which may be sprung into seating engagement in a circular groove 44, near the inner edge 34 of the drum. The total installation effort is thus seen to consist of but two quick and simple movements which demand no expert skill or special knowledge. Removal for repair or replacement is equally simple, and requires no special tools. In fact, the operation is about as simple as removing or replacing a hubcap. In addition, the system gives increased brake lining area and eliminates damage to drums due to scoring; it provides for even brake lining wear, and reduces generated heat, all resulting in increased brake life.

While a certain preferred embodiment has been shown and described, for illustrative purposes, various modifications will be apparent to those skilled in the art, in the light of this disclosure, and the invention should not, therefore, be deemed as limited, except insofar as shall appear from the spirit and scope of the appended claims.

We claim:

1. A brake system for vehicles comprising a drum having a cylindrical inner face, an annular rib in said drum, within, concentric with, and closely adjacent said face, said face having a series of equally spaced grooves arranged elementwise of its cylindrical surface, and opening through an outer edge of the drum, said face also having a circular groove concentric with its cylindrical axis and adjacent said outer edge, a holding band of split form having a series of slots in each edge, said slots arranged in oppositely disposed pairs, said band having an outwardly disposed corrugation extending between the opposed slots of each pair, said corrugations being spaced to correspond with the spacing of said series of grooves in the drum, and of a size to mate therewith, and the portions of said band beyond said corrugation adapted to be received between said rib and the inner face of said drum, a strip of brake lining bonded to the inner face of said band, and a split ring adapted to mate within the inner face of the drum, and having an annular flange adapted to seat in said circular groove in the drum.

2. A brake system for vehicles comprising a drum having a cylindrical, inner face with a series of equi-spaced, laterally extending grooves, an annular rib in said drum, within, concentric with, and closely adjacent said face, said face also having a circular groove concentric with its cylinder axis and adjacent its outer edge, a holding band of split form having a series of splines arranged to mate with the said series of grooves in the drum, and said band having edge slots adjacent said splines, and adapted to be received between said rib and said face of the drum, a strip of brake lining bonded to the inner face of said band, and a split ring adapted to mate within the inner face of the drum, and having an annular flange adapted to seat in said circular groove.

3. A brake system for vehicles comprising a drum having a cylindrical, inner face with a series of equi-spaced, laterally extending grooves, an annular rib in said drum, within, concentric with, and closely adjacent said face, said face also having a circular groove concentric with its cylinder axis and adjacent its outer edge, a holding band of split form having a series of splines each having its ends spaced inwardly from the opposite edges of the band, said splines arranged to mate with the said series of grooves in the drum, and the edges of said band adapted to be received between said rib and said face of the drum, a strip of brake lining bonded to the inner face of said band, and a split ring adapted to mate within the inner face of the drum, and having an annular flange adapted to seat in said circular groove.

4. A brake system for vehicles comprising a drum having a cylindrical inner face with grooves parallel to the cylinder axis, a holding band having brake lining bonded to its inner face, and having, on its outer face, splines adapted to mate with said grooves, a rib in said drum concentric with and spaced radially inwardly from said face, the edges of said band adapted to be received between said rib and said face of the drum, said face having a circular groove concentric with the cylinder axis, and a split, keeper ring adapted to seat in said circular groove.

References Cited in the file of this patent
UNITED STATES PATENTS

| | | |
|---|---|---|
| 1,616,659 | Heaney | Feb. 8, 1927 |
| 1,850,649 | Archibald | Mar. 22, 1932 |
| 1,950,592 | Bock | Mar. 13, 1934 |
| 1,978,563 | Bragg | Oct. 30, 1934 |
| 2,727,845 | Bishop | Dec. 20, 1955 |